United States Patent
Takada et al.

(10) Patent No.: US 10,241,236 B2
(45) Date of Patent: Mar. 26, 2019

(54) POLARIZING PLATE

(71) Applicant: NITTO DENKO CORPORATION, Ibaraki-shi, Osaka (JP)

(72) Inventors: Katsunori Takada, Ibaraki (JP); Naotaka Higuchi, Ibaraki (JP); Kota Nakai, Ibaraki (JP); Shinobu Nagano, Ibaraki (JP); Eiko Suefusa, Ibaraki (JP); Yoshitsugu Kitamura, Ibaraki (JP); Keisuke Kimura, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 210 days.

(21) Appl. No.: 15/290,775

(22) Filed: Oct. 11, 2016

(65) Prior Publication Data

US 2017/0123111 A1 May 4, 2017

(30) Foreign Application Priority Data

Nov. 4, 2015 (JP) ................................. 2015-216399

(51) Int. Cl.
*G02B 1/14* (2015.01)
*G02B 5/30* (2006.01)
(Continued)

(52) U.S. Cl.
CPC .................. *G02B 1/14* (2015.01); *B32B 3/02* (2013.01); *B32B 3/266* (2013.01);
(Continued)

(58) Field of Classification Search
None
See application file for complete search history.

(56) References Cited

U.S. PATENT DOCUMENTS 6,055,096 A * 4/2000 Michihata ............ G02B 5/3033
359/350
8,329,847 B2 12/2012 Kim et al.
(Continued)

FOREIGN PATENT DOCUMENTS

EP 2 535 748 A1 12/2012
JP 07333425 A * 12/1995
(Continued)

OTHER PUBLICATIONS

Machine Translation of JP 2002236213 A, Aug. 2002 (Year: 2002).*
(Continued)

*Primary Examiner* — Jeffrey A Vonch
(74) *Attorney, Agent, or Firm* — Westerman, Hattori, Daniels & Adrian, LLP (57) ABSTRACT

A primary object of the present invention is to provide a polarizing plate excellent in durability. A polarizing plate (100) according to an embodiment of the present invention includes: a polarizer (10); and a protective film (21 and 22) arranged on at least one side of the polarizer (10). The polarizing plate (100) has a dimensional change ratio of −0.2% or more in a transmission axis direction thereof when the polarizing plate (100) cut into a size measuring 100 mm by 100 mm is bonded to a glass plate with a pressure-sensitive adhesive and the following operation is repeated 100 times: the polarizing plate (100) bonded to the glass plate is left to stand under an atmosphere at −40° C. for 30 minutes and then left to stand under an atmosphere at 85° C. for 30 minutes.

13 Claims, 4 Drawing Sheets

(51) Int. Cl.
  *B32B 27/16* (2006.01)
  *B32B 3/02* (2006.01)
  *B32B 38/00* (2006.01)
  *B32B 3/26* (2006.01)
  *G02F 1/1335* (2006.01)
  *B32B 3/24* (2006.01)
  *B32B 7/12* (2006.01)
  *B32B 27/08* (2006.01)
  *B32B 27/30* (2006.01)
  *B32B 38/04* (2006.01)

(52) U.S. Cl.
  CPC ........ *B32B 38/0036* (2013.01); *G02B 5/3033* (2013.01); *B32B 7/12* (2013.01); *B32B 27/08* (2013.01); *B32B 27/16* (2013.01); *B32B 27/306* (2013.01); *B32B 38/0004* (2013.01); *B32B 2038/0028* (2013.01); *B32B 2038/042* (2013.01); *B32B 2038/047* (2013.01); *B32B 2307/42* (2013.01); *B32B 2307/518* (2013.01); *B32B 2307/734* (2013.01); *B32B 2329/04* (2013.01); *B32B 2551/00* (2013.01); *G02B 5/305* (2013.01); *Y10S 428/91* (2013.01); *Y10T 428/24273* (2015.01); *Y10T 428/24322* (2015.01); *Y10T 428/24777* (2015.01)

(56) References Cited

U.S. PATENT DOCUMENTS

| | | | |
|---|---|---|---|
| 2002/0015807 A1* | 2/2002 | Sugino | G02B 5/3033 428/1.31 |
| 2002/0162483 A1* | 11/2002 | Shimizu | C08J 5/18 106/170.28 |
| 2003/0020208 A1* | 1/2003 | Tasaka | B29C 41/24 264/217 |
| 2003/0049459 A1* | 3/2003 | Ishii | G02B 1/105 428/423.1 |
| 2003/0072078 A1* | 4/2003 | Higashio | B29C 71/0072 359/485.01 |
| 2003/0151706 A1* | 8/2003 | Sugino | G02B 1/105 349/96 |
| 2004/0212555 A1* | 10/2004 | Falco | G06F 1/1626 345/50 |
| 2005/0117217 A1* | 6/2005 | Yamaoka | G02B 5/3033 359/485.03 |
| 2005/0271834 A1* | 12/2005 | Michihata | C08J 5/18 428/1.31 |
| 2006/0023147 A1* | 2/2006 | Wasai | G02B 5/3083 349/117 |
| 2006/0187548 A1* | 8/2006 | Rao | C08J 7/047 359/487.02 |
| 2006/0257589 A1* | 11/2006 | Hayashi | C08B 3/06 428/1.2 |
| 2007/0146887 A1* | 6/2007 | Ikeda | G02B 1/111 359/586 |
| 2007/0172605 A1* | 7/2007 | Ohtani | C08J 5/18 428/1.31 |
| 2007/0211335 A1* | 9/2007 | Ikeda | G02B 5/305 359/487.05 |
| 2007/0231506 A1* | 10/2007 | Ohgaru | G02B 5/3033 428/1.31 |
| 2009/0185270 A1* | 7/2009 | Maezawa | G02B 5/3033 359/485.01 |
| 2009/0187000 A1* | 7/2009 | Nakai | B29C 71/0072 527/300 |
| 2010/0039590 A1 | 2/2010 | Miyatake et al. | |
| 2010/0068420 A1 | 3/2010 | Kim et al. | |
| 2010/0253892 A1* | 10/2010 | Higashi | G02B 5/3083 349/118 |
| 2011/0043733 A1* | 2/2011 | Suzuki | C09J 135/04 349/96 |
| 2013/0242236 A1* | 9/2013 | Shutou | G02B 5/3033 349/96 |
| 2013/0328051 A1* | 12/2013 | Franklin | H01L 29/786 257/59 |
| 2014/0118826 A1* | 5/2014 | Jiao | G02B 5/30 359/491.01 |
| 2014/0178706 A1* | 6/2014 | Park | G02B 5/3033 428/480 |
| 2014/0347730 A1* | 11/2014 | Takeda | G02B 5/305 359/513 |
| 2015/0146140 A1* | 5/2015 | Saneto | G02B 1/14 349/96 |
| 2016/0048056 A1* | 2/2016 | Xu | G02F 1/133528 362/19 |
| 2016/0216422 A1* | 7/2016 | Kim | G02B 5/3033 |
| 2016/0252774 A1* | 9/2016 | Kawamura | G02B 5/3025 349/96 |
| 2016/0273267 A1* | 9/2016 | Asanoi | E06B 9/24 |
| 2016/0363699 A1* | 12/2016 | Kunai | G02B 1/10 |
| 2017/0059756 A1* | 3/2017 | Yoo | G02B 5/305 |

FOREIGN PATENT DOCUMENTS

| | | | |
|---|---|---|---|
| JP | H07-333425 A | | 12/1995 |
| JP | 09251110 A | * | 9/1997 |
| JP | 2002236213 A | * | 8/2002 |
| JP | 2002258052 A | * | 9/2002 |
| JP | 2002372621 A | * | 12/2002 |
| JP | 2003098345 A | * | 4/2003 |
| JP | 2006126585 A | * | 5/2006 |
| JP | 2006243132 A | * | 9/2006 |
| JP | 2006308936 A | * | 11/2006 |
| JP | 2010277018 A | * | 12/2010 |
| JP | 2011221278 A | * | 11/2011 |
| JP | 2013186252 A | * | 9/2013 |
| KR | 20120118205 A | * | 10/2012 |
| TW | 200900755 A | * | 1/2009 |
| WO | 2008/010650 A1 | | 1/2008 |

OTHER PUBLICATIONS

Machine Translation of JP 2006308936 A, Nov. 2006 (Year: 2006).*
Extended European Search Report dated Mar. 8, 2017, issued in counterpart European Patent Application No. 16194113.3. (8 pages).

* cited by examiner

POLARIZING PLATE

BACKGROUND OF THE INVENTION

1. Field of the Invention

The present invention relates to a polarizing plate.

2. Description of the Related Art

A polarizing plate has been used in an image display apparatus (e.g., a liquid crystal display apparatus) of a cellular phone, a notebook personal computer, or the like. In recent years, the use of the polarizing plate in, for example, a meter display portion of an automobile or a smart watch has been desired, and hence the formation of the polarizing plate into a shape except a rectangular shape and the formation of a through-hole in the polarizing plate have been desired. However, when any such form is adopted, a problem in terms of durability is liable to occur. With a view to improving the durability, for example, there has been proposed a method involving thermally treating a polarizer at a temperature of 95° C. or more, and laminating a protective film on the thermally treated polarizer to provide a polarizing plate (see Japanese Patent Application Laid-open No. Hei 7-333425). However, a further improvement in durability has been required.

SUMMARY OF THE INVENTION

The present invention has been made to solve the problem, and a primary object of the present invention is to provide a polarizing plate excellent in durability.

As a result of their extensive investigations, the inventors have paid attention to the fact that when a polarizing plate is bonded to any other member (e.g., a glass plate) through intermediation of a pressure-sensitive adhesive layer, the polarizing plate side of the pressure-sensitive adhesive layer is deformed (shrunk) by a change in external environment, and a stress produced by the deformation is related to the durability of the polarizing plate (the occurrence of a crack), and have found that when the dimensional change ratio of the polarizing plate is controlled, the occurrence of a stress between the respective members is suppressed and hence the object can be achieved. Thus, the inventors have completed the present invention.

A polarizing plate according to an embodiment of the present invention includes: a polarizer; and a protective film arranged on at least one side of the polarizer. The polarizing plate has a dimensional change ratio of −0.2% or more in a transmission axis direction thereof when the polarizing plate cut into a size measuring 100 mm by 100 mm is bonded to a glass plate with a pressure-sensitive adhesive and the following operation is repeated 100 times: the polarizing plate bonded to the glass plate is left to stand under an atmosphere at −40° C. for 30 minutes and then left to stand under an atmosphere at 85° C. for 30 minutes. In one embodiment of the present invention, the polarizer has a thickness of 20 µm or less. In one embodiment of the present invention, the polarizing plate is subjected to a heat treatment under conditions of a temperature in a range of from 50° C. to 120° C. and a time period of 1 hour or more and 100 hours or less. In one embodiment of the present invention, the polarizing plate has formed therein a through-hole. In one embodiment of the present invention, the polarizing plate includes a site having an outer edge forming a substantially V-shape that is convex inward in a surface direction. In one embodiment of the present invention, the polarizing plate has the dimensional change ratio of 0.1% or less.

According to the present invention, the polarizing plate excellent in durability can be provided.

DETAILED DESCRIPTION OF THE PREFERRED EMBODIMENTS

Embodiments of the present invention are described below. However, the present invention is not limited to these embodiments.

A. Polarizing Plate

Figure 1:
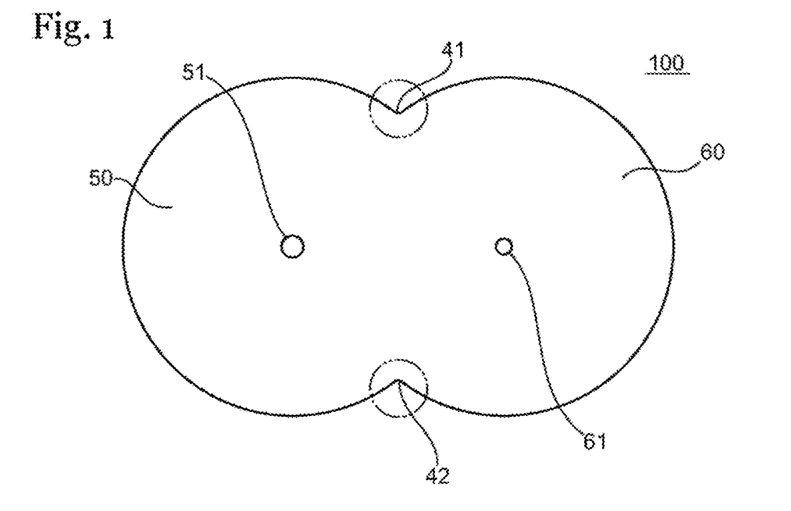
FIG. 1 is a plan view of a polarizing plate according to one embodiment of the present invention.
Figure 2:
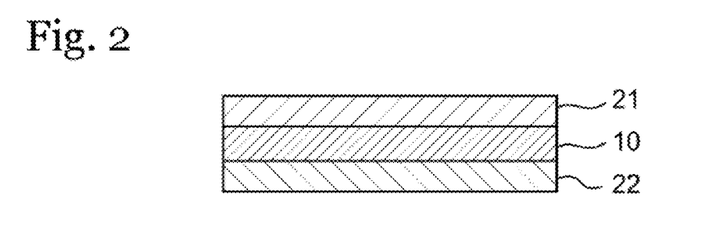
FIG. 2 is a partially enlarged sectional view of the polarizing plate illustrated in FIG. 1.

FIG. 1 is a plan view of a polarizing plate according to one embodiment of the present invention, and FIG. 2 is a partially enlarged sectional view of the polarizing plate illustrated in FIG. 1. A polarizing plate 100 is suitably used in the meter panel of an automobile. The polarizing plate 100 includes a first display portion 50 and a second display portion 60 that are continuously arranged, and through-holes 51 and 61 for fixing various meter needles are formed around the centers of the respective display portions. The diameter of each of the through-holes is, for example, from 0.5 mm to 100 mm. The outer edge of each of the display portions 50 and 60 is formed into an arc shape along the rotational direction of a meter needle.

The polarizing plate 100 includes a polarizer 10, a first protective film 21 arranged on one side of the polarizer 10, and a second protective film 22 arranged on the other side of the polarizer 10. The protective films 21 and 22 are each typically bonded to the surface of the polarizer 10 through intermediation of an adhesive layer, though the layer is not shown. Although the protective films are arranged on both sides of the polarizer in this illustrated example, a protective film may be arranged only on one side thereof.

The polarizing plate of the present invention has a dimensional change ratio in its transmission axis direction of −0.2% or more, preferably −0.1% or more, more preferably −0.05% or more when the polarizing plate is cut into a size measuring 100 mm by 100 mm and the cut polarizing plate is bonded to a glass plate with a pressure-sensitive adhesive, and in the state, the following operation is repeated 100 times (change ratio of a dimension after a heat cycle test to that before the test): the polarizing plate is left to stand under an atmosphere at −40° C. for 30 minutes and then left to stand under an atmosphere at 85° C. for 30 minutes. Meanwhile, the dimensional change ratio in the transmission axis direction is, for example, 0.1% or less. A polarizing plate satisfying such dimensional change ratio can have excellent durability. Specifically, the polarizing plate satisfying such dimensional change ratio shows an extremely small change in shape due to a change in external environment, and hence when the polarizing plate is bonded to any other member (e.g., the glass substrate of a liquid crystal cell or the like) through intermediation of a pressure-sensitive adhesive layer, an influence on the adjacent pressure-sensitive adhesive layer is extremely small. Accordingly, a change in shape of the pressure-sensitive adhesive layer due to the change in external environment is suppressed, and hence the occurrence of a stress between the respective members (e.g., a stress produced when the modulus of elasticity of the pressure-sensitive adhesive layer increases at low temperature) can be prevented. As a result, a crack does not occur in the polarizing plate and hence the polarizing plate can have extremely excellent durability.

The dimensional change ratio in the absorption axis direction of the polarizing plate after the heat cycle test to that before the test is, for example, from −0.6% to 0%. The dimensional change ratio may be determined from the following equation.

Dimensional change ratio (%)={(dimension after heat cycle test/dimension before heat cycle test)−1}×100

When a through-hole is formed like the illustrated example, the position of the through-hole may be appropriately set in accordance with, for example, the applications of the polarizing plate. The crack is liable to occur by using the peripheral edge of the through-hole as a starting point, and the tendency may be more remarkable as the position of the through-hole becomes more distant from the outer edge of the polarizing plate. As a result, as the position of the through-hole becomes more distant from the outer edge of the polarizing plate (e.g., its distance from the outer edge of the polarizing plate is 15 mm or more), a durability-improving effect exhibited by the fact that the dimensional change ratio is controlled can be more significantly obtained. As in the peripheral edge of the through-hole, a site whose outer edge forms a V-shape (including an R-shape) that is convex inward in a surface direction, such as a boundary portion 41 or 42 between the respective display portions, is also liable to be the starting point of the crack.

Figure 3:
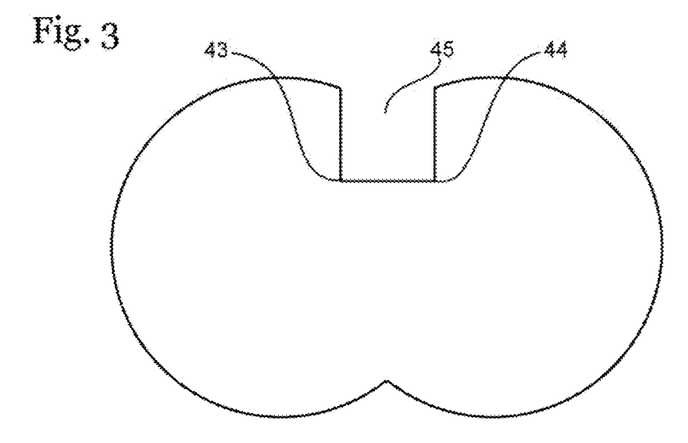
FIG. 3 is a plan view of a polarizing plate according to another embodiment of the present invention.
Figure 4A:
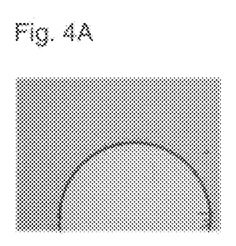
FIG. 4A is a photograph for showing the periphery of a through-hole of the polarizing plate of Example 1 after a heat cycle test.
Figure 4B:
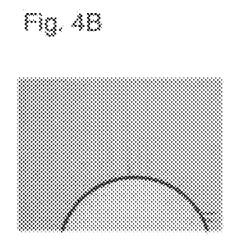
FIG. 4B is a photograph for showing the periphery of a through-hole of the polarizing plate of Example 2 after a heat cycle test.
Figure 4C:
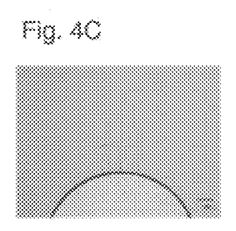
FIG. 4C is a photograph for showing the periphery of a through-hole of the polarizing plate of Example 3 after a heat cycle test.
Figure 4D:
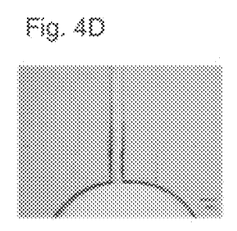
FIG. 4D is a photograph for showing the periphery of a through-hole of the polarizing plate of Comparative Example 1 after a heat cycle test.

The polarizing plate of the present invention is not limited to the construction of the illustrated example and may be appropriately changed. For example, the shape of the polarizing plate, the presence or absence of the through-holes, the shapes and sizes of the through-holes, and the number and formation positions of the through-holes may be appropriately changed. Specifically, there is given a mode in which V-shaped portions 43 and 44 that are convex inward in the surface direction are formed so as to be adjacent to each other, and a notch 45 is formed as illustrated in FIG. 3.

A-1. Polarizer

The polarizer typically includes a resin film containing a dichromatic substance. Examples of the dichromatic substance include iodine and an organic dye. The substances may be used alone or in combination. Of those, iodine is preferably used.

Any appropriate resin may be used as a resin for forming the resin film. A hydrophilic resin (e.g., a polyvinyl alcohol (PVA)-based resin) is preferably used as the resin. Examples of the PVA-based resin include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The saponification degree of the PVA-based resin is typically from 85 mol % to 100 mol %, preferably 95.0 mol % or more, more preferably 99.0 mol % or more, particularly preferably 99.93 mol % or more. The saponification degree may be determined in conformity with JIS K 6726-1994. The use of the PVA-based resin having such saponification degree can provide a polarizer excellent in durability.

The average polymerization degree of the PVA-based resin may be appropriately selected depending on purposes. The average polymerization degree is typically from 1,000 to 10,000, preferably from 1,200 to 6,000, more preferably from 2,000 to 5,000. The average polymerization degree may be determined in conformity with JIS K 6726-1994.

The polarizer preferably shows absorption dichroism in the wavelength range of from 380 nm to 780 nm. The single axis transmittance (Ts) of the polarizer is preferably 40% or more, more preferably 41% or more, still more preferably 42% or more, particularly preferably 43% or more. A theoretical upper limit for the single axis transmittance is 50%, and a practical upper limit therefor is 46%. In addition, the single axis transmittance (Ts) is a Y value measured with the two-degree field of view (C light source) of JIS Z 8701 and subjected to visibility correction, and may be measured with, for example, a spectrophotometer (manufactured by JASCO Corporation, V7100). The polarization degree of the polarizer is preferably 99.8% or more, more preferably 99.9% or more, still more preferably 99.95% or more.

The thickness of the polarizer may be set to any appropriate value. The thickness is typically from 1 μm to 80 μm, preferably from 3 μm to 40 μm. In one embodiment, the thickness of the polarizer is 20 μm or less, preferably 18 μm or less, more preferably 15 μm or less. The use of the polarizer having such thickness can satisfactorily achieve the dimensional change ratio without performing a heat treatment to be described later.

The polarizer may be typically obtained by subjecting the resin film to treatments, such as a swelling treatment, a stretching treatment, a dyeing treatment with the dichromatic substance, a cross-linking treatment, a washing treatment, and a drying treatment. The number of times of each of the treatments, the order in which the treatments are performed, the timings of the treatments, and the like may be appropriately set. When the resin film is subjected to each of the treatments, the film may be a resin layer formed on a substrate.

The cross-linking treatment is performed by, for example, bringing a boric acid solution (e.g., an aqueous solution of boric acid) into contact with the resin film. In addition, when a wet stretching system is adopted in the stretching treatment, the stretching is preferably performed while a boric acid solution is brought into contact with the resin film. In ordinary cases, the resin film is uniaxially stretched at from 3 times to 7 times from the viewpoint that excellent polarization characteristics are obtained. A stretching direction in the stretching treatment may correspond to the absorption axis direction of the polarizer to be obtained. The transmission axis direction thereof may be perpendicular to the absorption axis direction. In one embodiment, while an elongated resin film is conveyed in its lengthwise direction, the film is stretched in the conveying direction (MD). In this case, the absorption axis direction of the polarizer to be obtained may be the lengthwise direction (MD), and the transmission axis direction thereof may be a widthwise direction (TD).

A-2. Protective Film

As the formation materials of the protective film, there are given, for example, a cellulose-based resin, such as diacetyl cellulose or triacetyl cellulose (TAC), a (meth)acrylic resin, a cycloolefin-based resin, an olefin-based resin, such as polypropylene, an ester-based resin, such as a polyethylene terephthalate-based resin, a polyamide-based resin, a polycarbonate-based resin, and copolymer resins thereof. The term "(meth)acrylic resin" refers to an acrylic resin and/or a methacrylic resin.

The thickness of the protective film is preferably from 10 μm to 200 μm. A surface-treated layer may be formed on one side of the protective film (side on which the polarizer is not arranged). Specifically, the side may be subjected to a hard coat treatment, an antireflection treatment, or a treatment intended for diffusion or anti-glaring. In addition, the protective film may function as a retardation film. When the protective films are arranged on both sides of the polarizer like the illustrated example, the constructions (including a formation material and a thickness) of both the films may be identical to each other, or may be different from each other.

As described above, the protective film is typically bonded to the surface of the polarizer through intermediation of the adhesive layer. Any appropriate adhesive may be adopted as an adhesive to be used in the bonding of the protective film. For example, an aqueous adhesive, a solvent-based adhesive, or an active energy ray-curable adhesive is used. An adhesive containing a PVA-based resin is preferably used as the aqueous adhesive.

B. Method of Producing Polarizing Plate

The polarizing plate of the present invention is produced by any appropriate method as long as the dimensional change ratio can be achieved. In one embodiment, the polarizing plate of the present invention is produced by a method involving: preparing a polarizing film laminate including a polarizer and a protective film arranged on at least one side of the polarizer; and shrinking the polarizing film laminate as required.

The polarizing film laminate is typically produced by bonding the protective film to one side, or each of both sides, of the polarizer.

The polarizing film laminate is shrunk as required. The shrinkage of the polarizing film laminate can provide a polarizing plate that can satisfactorily achieve the dimensional change ratio irrespective of, for example, the thickness of the polarizer. A method for the shrinkage is typically, for example, a method involving heating the polarizing film laminate. A heating temperature is, for example, from 50° C. to 120° C., preferably from 70° C. to 90° C. When the temperature falls within such range, the polarizing film laminate can be efficiently shrunk while its optical characteristics (e.g., a hue, a transmittance, and a polarization degree) are secured. A heating time is, for example, from 1 hour to 100 hours, preferably 2 hours or more, more preferably 10 hours or more. The heating may be performed in one stage, or may be performed in a plurality of stages. In addition, the heating temperature may be kept substantially constant, or may be changed continuously or in a stepwise manner.

A shrinkage ratio is preferably 0.2% or more, more preferably 0.3% or more in, for example, the transmission axis direction of the polarizer in the polarizing film laminate. Meanwhile, the shrinkage ratio in the transmission axis direction is, for example, 0.6% or less. With such shrinkage ratio, it can be judged that the polarizing film laminate is shrunk to a sufficient level. The polarizing film laminate may shrink in its absorption axis direction to a larger extent than in the transmission axis direction, and hence at the initial stage of the shrinkage, a dimension in the transmission axis direction of the polarizing film laminate apparently increases for the time being in some cases. In any such case, as the shrinkage progresses, the dimension in the transmission axis direction may reduce from a dimension at the time of the initiation of the shrinkage (at the time of the initiation of the heating).

A shrinkage ratio in the absorption axis direction of the polarizing film laminate is preferably 0.3% or more, more preferably 0.4% or more. Meanwhile, the shrinkage ratio in the absorption axis direction is, for example, 1.0% or less. The shrinkage ratio may be determined from the following equation.

$$\text{Shrinkage ratio (\%)} = \{1 - (\text{dimension after heating}/\text{dimension before heating})\} \times 100$$

The polarizing plate of the present invention can be formed into a desired shape because the polarizing plate has excellent durability. A method of forming the polarizing plate into the desired shape is typically, for example, a method involving cutting (punching) the polarizing film laminate. When the polarizing film laminate is shrunk, the cutting may be performed before the shrinkage, or may be performed after the shrinkage. The cutting is preferably performed after the shrinkage from the viewpoint that the forming into the desired shape is performed more accurately.

Any appropriate method may be adopted as a cutting (punching) method. For example, a method involving irradiating the laminate with laser light or a method involving using a cutting blade (punching die), such as a Thomson blade or a pinnacle blade, is given. The laser light irradiation provides a smooth cut surface and can suppress the occurrence of the starting point of a crack (initial crack), and hence can contribute to a further improvement in durability. Even when the cutting blade is used (even when the initial crack occurs), the dimensional change ratio is controlled and hence excellent durability can be obtained.

Any appropriate laser may be adopted as the laser as long as the polarizing film laminate (polarizing plate) can be cut. A laser that can emit light having a wavelength in the range of from 150 nm to 11 μm is preferably used. Specific examples thereof include a gas laser, such as a $CO_2$ laser, a solid laser, such as an YAG laser, and a semiconductor laser. Of those, a $CO_2$ laser is preferably used.

A condition for the laser light irradiation may be set to any appropriate condition depending on, for example, the laser to be used. When the $CO_2$ laser is used, an output condition is preferably from 10 W to 1,000 W, more preferably from 100 W to 400 W.

C. Usage

The polarizing plate of the present invention is bonded to any other member (e.g., the glass substrate of a liquid crystal cell or the like) through intermediation of, for example, a pressure-sensitive adhesive layer. The thickness of the pressure-sensitive adhesive layer is preferably from 4 μm to 50 μm. An acrylic pressure-sensitive adhesive is preferably used as a pressure-sensitive adhesive forming the pressure-sensitive adhesive layer. The polarizing plate of the present invention may adopt the form of a polarizing plate with a pressure-sensitive adhesive layer having the pressure-sensitive adhesive layer arranged on at least one side thereof in advance.

Now, the present invention is specifically described by way of Examples. However, the present invention is not limited to these Examples.

Example 1

(Production of Polarizing Film Laminate Sheet)

A film (thickness: 28 µm) obtained by incorporating iodine into an elongated PVA-based resin film and uniaxially stretching the film in its lengthwise direction (MD) was used as a polarizer.

A PVA-based adhesive was applied to one side of the polarizer so that its thickness after drying became 100 nm, and an elongated TAC film having a thickness of 40 µm was bonded to the polarizer so that their lengthwise directions were aligned with each other.

Subsequently, a PVA-based adhesive was applied to the other side of the polarizer so that its thickness after drying became 100 nm, and an elongated acrylic film having a thickness of 30 µm was bonded to the polarizer so that their lengthwise directions were aligned with each other.

Thus, a polarizing film laminate sheet having a construction "TAC film/polarizer/acrylic film" was obtained.

The resultant polarizing film laminate sheet was cut with a $CO_2$ laser (wavelength: 9.35 µm, output: 150 W) to provide a cut piece of a size measuring 112 mm by 112 mm, the cut piece having a through-hole having a diameter of 2 mm formed in a site distant from its outer edge by 55 mm.

The resultant cut piece was placed under an atmosphere at 85° C. for 50 hours to provide a polarizing plate. The polarizing plate had a shrinkage ratio in its absorption axis direction of 0.74% and a shrinkage ratio in its transmission axis direction of 0.44%, the shrinkage ratios each serving as a ratio of a dimension after the heating to that before the heating. The shrinkage ratios each serving as a ratio of a dimension after the heating to that before the heating were each determined by: separately preparing a cut piece cut out of the polarizing film laminate sheet into a size measuring 100 mm by 100 mm (no through-hole was formed in the cut piece); and measuring the position of a corner of the cut piece. In this case, the cut piece was cut out of the sheet so that a pair of sides opposite to each other corresponded to the transmission axis direction of the polarizer and another pair of sides opposite to each other corresponded to the absorption axis direction of the polarizer.

Example 2

A polarizing plate was obtained in the same manner as in Example 1 except that the resultant cut piece was placed under an atmosphere at 85° C. for 5 hours. The polarizing plate had a shrinkage ratio in its absorption axis direction of 0.45% and a shrinkage ratio in its transmission axis direction of 0.37%, the shrinkage ratios each serving as a ratio of a dimension after the heating to that before the heating, and each being measured by the same method as that of Example 1.

Example 3

A polarizing plate was obtained in the same manner as in Example 1 except that the resultant cut piece was placed under an atmosphere at 85° C. for 2.5 hours. The polarizing plate had a shrinkage ratio in its absorption axis direction of 0.34% and a shrinkage ratio in its transmission axis direction of 0.25%, the shrinkage ratios each serving as a ratio of a dimension after the heating to that before the heating, and each being measured by the same method as that of Example 1.

Example 4

A polarizing plate was obtained in the same manner as in Example 1 except that: the size of the cut piece was set to 52 mm by 52 mm; and the through-hole was formed in a site distant from the outer edge of the cut piece by 25 mm.

Example 5

A polarizing plate was obtained in the same manner as in Example 1 except that at the time of the production of the polarizing film laminate sheet, a polarizer having a thickness of 12 µm was used and the cut piece was not heated.

Example 6

A polarizing plate was obtained in the same manner as in Example 1 except that at the time of the production of the polarizing film laminate sheet, a polarizer having a thickness of 18 µm was used, a TAC film having a thickness of 60 µm was used instead of the acrylic film having a thickness of 30 µm, and the cut piece was not heated.

Comparative Example 1

A polarizing plate was obtained in the same manner as in Example 1 except that the cut piece was not heated.

Comparative Example 2

A polarizing plate was obtained in the same manner as in Example 4 except that the cut piece was not heated.

The durability of each of the resultant polarizing plates was evaluated by a heat cycle (HC, heat shock (HS)) test.

Specifically, each of the resultant polarizing plates was bonded to a glass plate with an acrylic pressure-sensitive adhesive (thickness: 20 µm) having a difference between a storage modulus of elasticity in a high-temperature region (85° C.) and a storage modulus of elasticity in a low-temperature region (−40° C.) of less than $1 \times 10^9$ Pa, having a storage modulus of elasticity at 25° C. of $1 \times 10^5$ Pa or more, and having a storage modulus of elasticity at 85° C. of less than $1 \times 10^6$ Pa. Thus, a test sample was obtained. The storage moduli of elasticity are each determined by performing measurement with a dynamic viscoelasticity-measuring apparatus (manufactured by Rheometric Scientific, "Advanced Rheometric Expansion System (ARES)") under the condition of a frequency of 1 Hz in the range of from −70° C. to 200° C. at a rate of temperature increase of 5° C./min to calculate a shear storage modulus.

The resultant test sample was left to stand under an atmosphere at −40° C. for 30 minutes and then left to stand under an atmosphere at 85° C. for 30 minutes. The foregoing operation was defined as one cycle and the cycle was repeated 100 times. After the heat cycle test, whether or not a crack occurred in the polarizing plate was observed.

In addition, the change ratio of a dimension in the transmission axis direction of the polarizing plate after the heat cycle test to that before the test was measured. The dimensional change ratio was determined by: separately preparing a cut piece cut out of the polarizing film laminate sheet (in each of Examples 1 to 4, out of the polarizing film laminate sheet heated in advance) into a size measuring 100 mm by 100 mm (no through-hole was formed in the cut piece); subjecting the cut piece to the heat cycle test; and measuring the position of a corner of the cut piece. In this case, the cut piece was cut out of the sheet so that a pair of sides opposite to each other corresponded to the transmission axis direction of the polarizer and another pair of sides opposite to each other corresponded to the absorption axis direction of the polarizer.

The dimensional change ratios of Examples and Comparative Examples are summarized in Table 1.

TABLE 1

|  | Dimensional change ratio (%) |
| --- | --- |
| Example 1 | 0.007 |
| Example 2 | −0.08 |
| Example 3 | −0.14 |
| Example 4 | 0.007 |
| Example 5 | −0.15 |
| Example 6 | −0.15 |
| Comparative Example 1 | −0.37 |
| Comparative Example 2 | −0.37 |

FIG. 4A to FIG. 4D are photographs obtained by observing the peripheries of the through-holes of the polarizing plates of Examples 1 to 3 and Comparative Example 1 after the HS tests with an optical microscope (manufactured by Olympus Corporation, MX61, magnification: 5). In Comparative Example 1, a crack that can be visually recognized with the eyes in a clear manner is observed. In contrast, in Example 1, the occurrence of a crack (including a microcrack) is not observed. In each of Examples 2 and 3, a microcrack that cannot be visually recognized with the eyes in a clear manner is observed, but the occurrence of a crack is suppressed as compared to Comparative Example 1. The cracks each occur along a stretching direction.

In Example 4, as in Example 1, the occurrence of a crack (including a microcrack) is not observed. In Comparative Example 1, the crack extends from the through-hole serving as a starting point to an end side of the polarizing plate. In contrast, in Comparative Example 2, a crack length is 12 mm.

In each of Examples 5 and 6, as in Example 1, the occurrence of a crack (including a microcrack) is not observed.

Figure 5A:
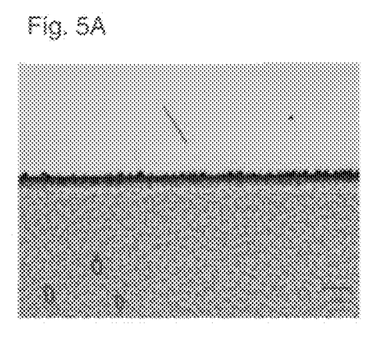
FIG. 5A is a photograph for showing the state of the periphery of an end side of the polarizing plate along the transmission axis direction of the test sample of Example 1 after the heat cycle test.
Figure 5B:
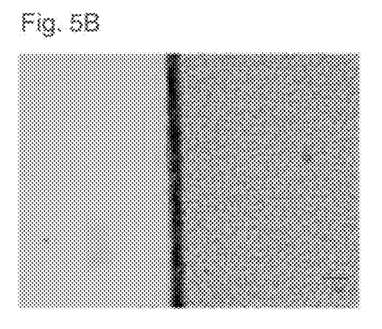
FIG. 5B is a photograph for showing the state of the periphery of an end side of the polarizing plate along the absorption axis direction thereof.
Figure 6A:
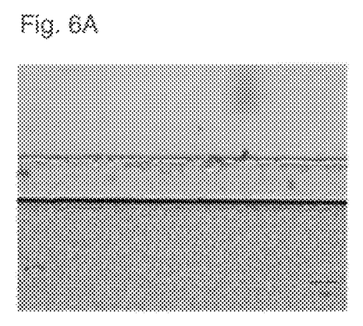
FIG. 6A is a photograph for showing the state of the periphery of an end side of the polarizing plate along the transmission axis direction of the test sample of Comparative Example 1 after the heat cycle test.
Figure 6B:
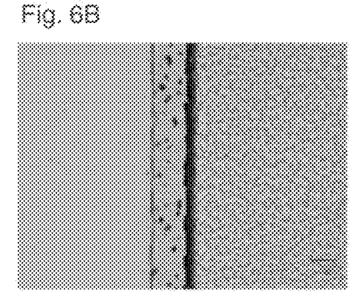
FIG. 6B is a photograph for showing the state of the periphery of an end side of the polarizing plate along the absorption axis direction thereof.

FIG. 5A and FIG. 5B are each a photograph for showing the state of an end portion of the polarizing plate of the test sample of Example 1 after the HS test, and FIG. 6A and FIG. 6B are each a photograph for showing the state of an end portion of the polarizing plate of the test sample of Comparative Example 1 after the HS test. In Comparative Example 1, a region in which the pressure-sensitive adhesive layer used at the time of the bonding of the polarizing plate to the glass plate is exposed is formed.

The polarizing plate of the present invention can be suitably used not only in an image display apparatus (a liquid crystal display apparatus or an organic EL device) of a rectangular shape but also in, for example, an image display portion of a particular shape typified by the meter display portion of an automobile or a smart watch.

What is claimed is:

1. A polarizing plate, comprising:
a polarizer; and
a protective film arranged on at least one side of the polarizer,
wherein the polarizing plate has been subjected to heat treatment under conditions of a temperature in a range from 85° C. to 120° C. and a time period of 1 hour or more and 100 hours or less,
wherein the polarizing plate has a dimensional change ratio of −0.2% or more in a transmission axis direction thereof;
wherein the dimensional change ratio is measured by cutting the polarizing plate to 100 mm by 100 mm while bonded to a glass plate with a pressure-sensitive adhesive and an operation wherein the polarizing plate bonded to the glass plate is left to stand under an atmosphere at −40° C. for 30 minutes and then left to stand under an atmosphere for 85° C. for 30 minutes, is repeated 100 times.

2. The polarizing plate according to claim 1, wherein the polarizing plate has the dimensional change ratio of 0.1% or less.

3. The polarizing plate according to claim 1, wherein the polarizing plate has the dimensional change ratio of −0.1 to 0.1%.

4. The polarizing plate according to claim 1, wherein the polarizing plate has a dimensional change ratio of −0.6 to 0% in an absorption axis direction,
wherein the dimensional change ratio in an absorption axis direction is measured by cutting the polarizing plate to 100 mm by 100 mm while bonded to a glass plate with a pressure-sensitive adhesive and an operation wherein the polarizing plate bonded to the glass plate is left to stand under an atmosphere at −40° C. for 30 minutes and then left to stand under an atmosphere at 85° C. for 30 minutes, is repeated 100 times.

5. The polarizing plate according to claim 1, further comprising a second protective film,
wherein the second protective film is arranged on another side of the polarizer that is opposite to the protective film.

6. A polarizing plate, comprising:
a polarizer; and
a protective film arranged on at least one side of the polarizer,
wherein the polarizing plate has been subjected to a heat treatment under conditions of a temperature in a range of from 85° C. to 120° C. and a time period of 1 hour or more and 100 hours or less,
wherein the polarizing plate has a dimensional change ratio of −0.2% or more in a transmission axis direction thereof;
wherein the dimensional change ratio is measured by cutting the polarizing plate to 100 mm by 100 mm while bonded to a glass plate with a pressure-sensitive adhesive and an operation wherein the polarizing plate bonded to the glass plate is left to stand under an atmosphere at −40° C. for 30 minutes and then left to stand under an atmosphere at 85° C. for 30 minutes, is repeated 100 times, and
the polarizing plate has one selected from the group consisting of a through-hole formed therein, a site having an outer edge forming a substantially V-shape that is convex inward in a surface direction, and the combination of the through-hole and the site.

7. The polarizing plate according to claim 6, wherein the polarizing plate has the dimensional change ratio of −0.1 to 0.1%.

8. The polarizing plate according to claim 6, wherein the polarizing plate has a dimensional change ratio of −0.6 to 0% in an absorption axis direction,
wherein the dimensional change ratio in an absorption axis direction is measured by cutting the polarizing plate to 100 mm by 100 mm while bonded to a glass plate with a pressure-sensitive adhesive and an operation wherein the polarizing plate bonded to the glass plate is left to stand under an atmosphere at −40° C. for 30 minutes and then left to stand under an atmosphere at 85° C. for 30 minutes, is repeated 100 times.

9. The polarizing plate according to claim 6, further comprising a second protective film,
wherein the second protective film is arranged on another side of the polarizer that is opposite to the protective film.

10. A polarizing plate, comprising:
a polarizer; and
a protective film arranged on at least one side of the polarizer,
wherein the polarizing plate has a thickness of 20 μm or less,
wherein the polarizing plate has been subjected to heat treatment under conditions of a temperature in a range from 85° C. to 120° C. and a time period of 1 hour or more and 100 hours or less,
wherein the polarizing plate has a dimensional change ratio of −0.2% or more in a transmission axis direction thereof;
wherein the dimensional change ratio is measured by cutting the polarizing plate to 100 mm by 100 mm while bonded to a glass plate with a pressure-sensitive adhesive and an operation wherein the polarizing plate bonded to the glass plate is left to stand under an atmosphere at −40° C. for 30 minutes and then left to stand under an atmosphere for 85° C. for 30 minutes, is repeated 100 times, and
the polarizing plate has one selected from the group consisting of a through-hole formed therein, a site having an outer edge forming a substantially V-shape that is convex inward in a surface direction, and a combination of the through-hole and the site.

11. The polarizing plate according to claim 10, wherein the polarizing plate has the dimensional change ratio of −0.1 to 0.1%.

12. The polarizing plate according to claim 10, wherein the polarizing plate has a dimensional change ratio of −0.6 to 0% in an absorption axis direction,
wherein the dimensional change ratio in an absorption axis direction is measured by cutting the polarizing plate to 100 mm by 100 mm while bonded to a glass plate with a pressure-sensitive adhesive and an operation wherein the polarizing plate bonded to the glass plate is left to stand under an atmosphere at −40° C. for 30 minutes and then left to stand under an atmosphere at 85° C. for 30 minutes, is repeated 100 times.

13. The polarizing plate according to claim 10, further comprising a second protective film,
wherein the second protective film is arranged on another side of the polarizer that is opposite to the protective film.

* * * * *